Figure 1:
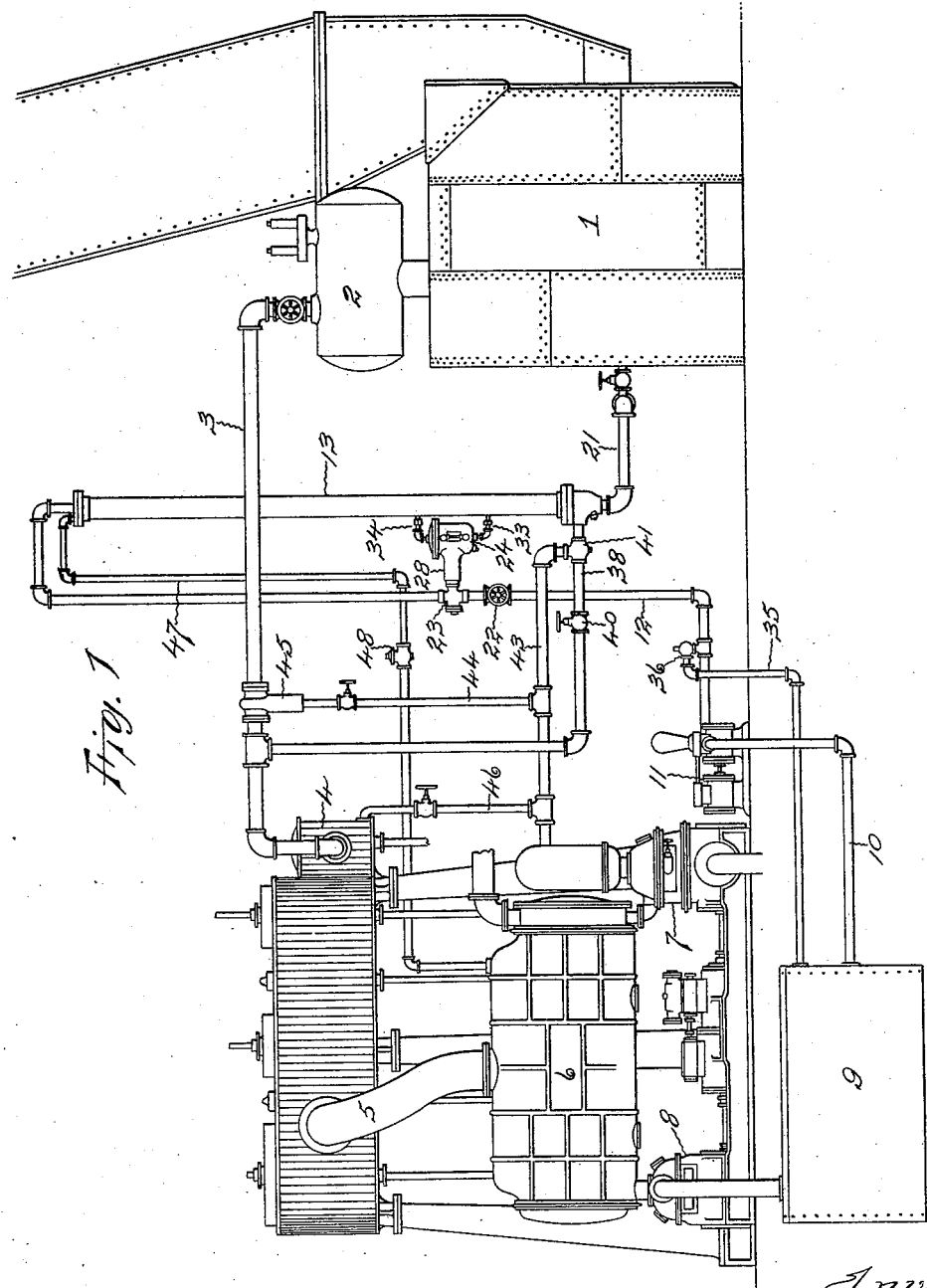

(No Model.)  3 Sheets—Sheet 1.

E. P. HOLLY.
BOILER FEED WATER FEEDING AND HEATING APPARATUS.

No. 586,952. Patented July 20, 1897.

Witnesses:
E. J. Hyde.
C. E. Buckland.

Inventor:
Edgar P. Holly,
by Harry R. Williams,
Atty.

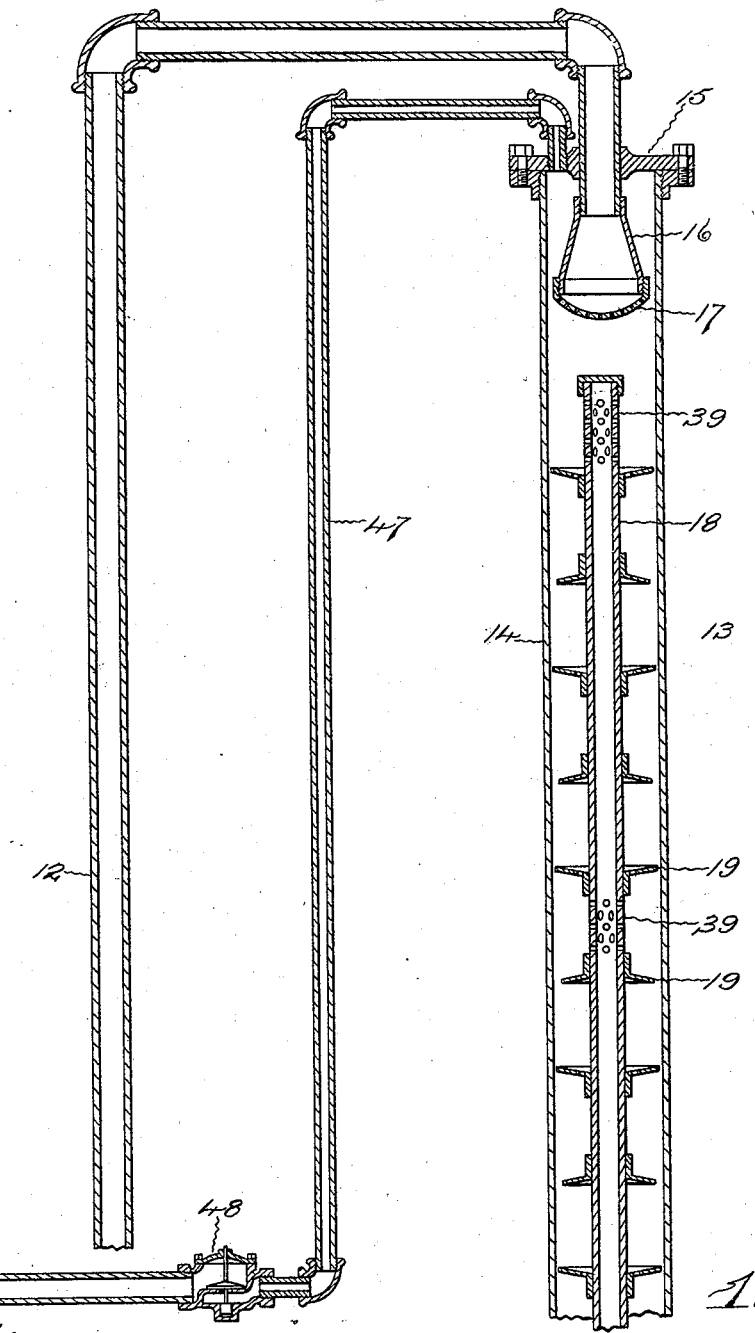

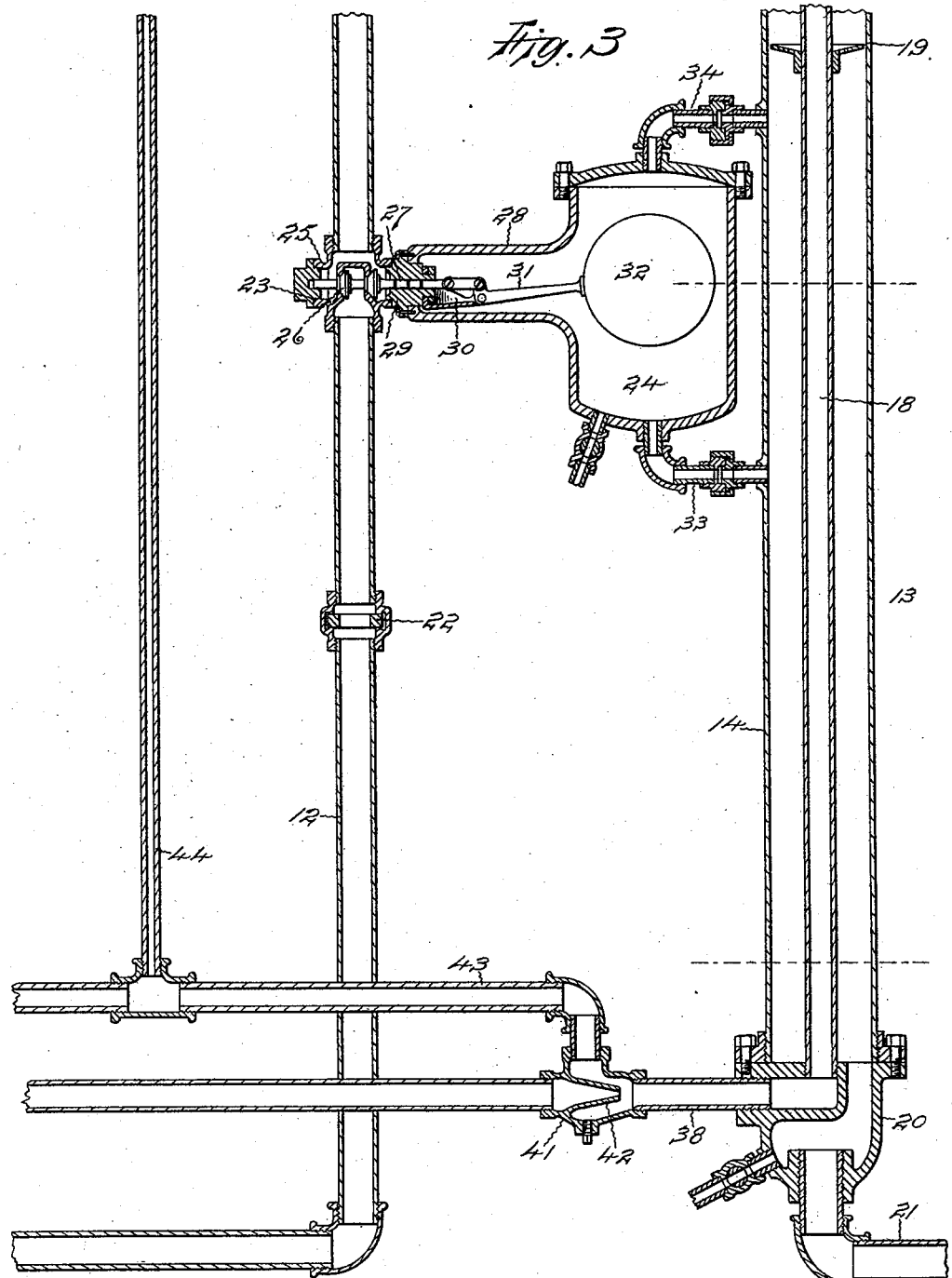

UNITED STATES PATENT OFFICE.

EDGAR P. HOLLY, OF HARTFORD, CONNECTICUT.

BOILER FEED-WATER FEEDING AND HEATING APPARATUS.

SPECIFICATION forming part of Letters Patent No. 586,952, dated July 20, 1897.

Application filed December 8, 1896. Serial No. 614,912. (No model.)

*To all whom it may concern:*

Be it known that I, EDGAR P. HOLLY, a citizen of the United States, residing at Hartford, in the county of Hartford and State of Connecticut, have invented certain new and useful Improvements in Boiler Feed-Water Feeding and Heating Apparatus, of which the following is a specification.

The invention relates to an apparatus constructed for automatically feeding water for a boiler to a heater in which the water is heated by direct exposure to the action of steam at the boiler pressure and temperature and from which the heated water flows by gravity into the boiler.

The object of the invention is to provide a simple and inexpensive apparatus of this nature which will feed just the necessary quantity of water to supply the amount evaporated in the boiler, which will heat the water that is fed very economically and raise it to a temperature equal to the temperature due to the boiler-pressure, and which will collect, return, and utilize all water of condensation from the various exhaust, return, and drip pipes of the plant or system at substantially condensing temperature without the aid of pumps, traps, or moving mechanisms.

This invention can without change of character or operation be embodied in an apparatus applicable for employment in connection with the feeding of water to the boilers of the steam plants of electric railways, electric light, power, and pumping stations, or for steamboat or steamship plants, or for heating systems designed for large buildings or groups of buildings.

In the accompanying drawings the invention is shown in connection with a marine plant, and Figure 1 illustrates a triple-expansion vertical engine and boiler with the steam connections. Fig. 2 is a detail enlarged sectional view of the upper part of the feeding and heating apparatus shown in connection with this plant, and Fig. 3 is a similar view of the lower part of the same.

Steam generated in the boiler 1 of this plant is led from the steam-dome 2 through the main steam-pipe 3 to the high-pressure cylinder-valve 4. After passing through the valves and various cylinders and actuating the several pistons the steam passes through the exhaust-pipe 5 to the condenser 6, which is provided with any common form of water-circulating pump 7 and air-pump 8, that discharges the water of condensation into the hot-well 9. The feed-water for the boiler is drawn from the hot-well through the pipe 10 by a feed-pump 11 and forced through the pipe 12 to the heater 13. This heater 13 has a comparatively long tubular shell 14, located substantially vertical, with the greater part of its length above the level of the water-line in the boiler. The feed-water pipe 12, which is illustrated as connected with a feed-pump, but which of course might be connected with some other source of water-supply, passes through a cap 15, secured to the upper end of the shell, and terminates in the interior in a sprayer or other device that will disseminate the water as it enters the heater. In the form shown this sprayer has a tapering shell 16 with a perforated curved nozzle-plate 17, but any common form of device for breaking the water from a solid body into sheets or drops may be used.

Supported in the upper part of the shell above the water-line by a central tube 18 are a number of baffle plates or disks 19. These disks are preferably dished and are alternately placed with the dishing up and down. The disks which are placed with the hollow up are provided with perforations or openings near the center for the passage of water, while the disks that are placed with the hollow down are slightly smaller in diameter than the others. With the disks arranged in this manner the feed-water that is sprayed into the top of the shell drops down from one disk to the other, flowing first toward the center and then toward the walls of the shell, and this insures that the water travels a long distance in passing through the heater and prevents the flow in the upper part of the heater of a solid body of water.

At the lower end of the shell is a base 20, and opening through this is a pipe 21, that is connected with pipes that lead to the boiler or boilers to allow a flow of water thereto from the lower part of the heater. The boiler-pipes are provided with suitable stop-cocks and the lower end of the heater is usually provided with a blow-out cock.

A gate 22 is located in the water-pipe 12 for shutting off the water-supply when necessary, and in this pipe between the gate and the heater-shell is a valve 23, which is automatically opened and closed according to the level of the water in the heater or a chamber 24, which is open to the heater.

The valve 23 is preferably a balanced valve having any common form of body 25 with two ordinary disks 26 and a spindle 27. The ends of the water-pipes are connected by ordinary means with the body, which is attached to the end of the tubular extension 28 of the casing of the chamber 24 by the plug 29, that carries the spindle. Supported by an arm 30, projecting from the plug, is a lever 31, that is connected at one end with the spindle and at the other end with a float 32. The bottom of the chamber is connected by a pipe 33 and the top of the chamber is connected by a pipe 34 with the interior of the heater. This float-chamber is located at the desired water-line of the heater in such position that the water standing in the heater and in the chamber at the normal level will raise the float and hold the valve closed, cutting off further supply of water through the feed-pipe to the heater, but when the level of the water is lowered the float will drop and open the valve, permitting the flow of sufficient water to restore the level and to again raise the float to cut off the supply. By this mechanism just sufficient water will flow into the heater to occupy the place of that which flows into the boiler and thus keep the water-level constant.

A blow-off cock may be connected with the bottom of the chamber 24 for cleaning purposes, and a water-glass is attached to permit the observation of the water-level.

A pipe 35 may be led from the water-pipe 12 to the hot-well 9, and in this pipe can be placed a relief-valve 36. With this if the pump should supply more water than is permitted to pass the automatic valve and than is necessary to supply the heater a portion may be allowed to flow back to the hot-well through this pipe and relief-valve, so that great pressure will not be generated in the water-pipe.

The tube 18 in the shell of the heater may be supported by the base 20, and connected with this is a steam-pipe 38, which is joined with the steam-main 3. One or more sections of the tube 18 above the water-line in the heater may be provided with perforations 39, and when the throttle-valve 40 is opened steam can flow from the main 3 through the pipe 38 to the tube 18 and thence through the perforations into the heater-shell. Of course with these connections steam will flow into the heater-shell under boiler-pressure and will consequently be at the temperature due to the pressure in the heater, where it will commingle with the feed-water being sprayed into the heater and dropping from disk to disk.

Located in the steam-pipe 38 is a suction-T 41. This T has an ejector-shaped nozzle 42, and connected with a branch of the T is a return-pipe 43. Leading to this return-pipe may be the drips for collecting the water of condensation from the various parts of the system. In the views there is shown a drip-pipe 44 from a steam-separator 45 in the steam-main and a drip-pipe 46 from the jacket of the high-pressure-cylinder valve, and of course drip-pipes from the other parts will be connected in the common manner.

Steam passing through the nozzle of the suction-T draws all of the water of condensation from the several localities and carries it into the heater without lowering its temperature.

Connected with the top of the heater-shell is a pipe 47, that leads to the condenser, and in this pipe is located a reducing-valve 48. By means of this should any air collect in the upper part of the heater it may escape through the reducing-valve, so that the action of the steam in the heater will not be impeded by collected air.

As stated, of course this feeding and heating system can be connected with any steam plant. The feed-water pipe may, instead of being connected with a pump, be connected with a water-main, with an injector, or any other source of water-supply. Connected with the return-pipe may be drips from steam-separators, from cylinder-jackets, from steam-mains of a power plant, or from radiators of a heating plant, and all the water of condensation from these various drips will be carried back into the feed-water heater by the flow of the heating-steam without the use of pumps and without reducing the temperature of the water of condensation—that is, taking it back at the temperature at which it is condensed, which temperature of course depends upon the pressure in the system.

By means of this apparatus the feed-water designed for any heating system or power plant can be heated quickly and economically and thoroughly by the steam at initial pressure, and this feed-water is automatically allowed to feed into the heater until the weight of the water column in the heater above the boiler water-line added to the pressure in the heater is greater than the pressure on the water in the boiler. Then the water will flow from the heater by gravity into the boiler.

The apparatus is simple in construction and has no moving parts to wear and get out of order. By its employment feed-water can be thoroughly and economically heated, and all drip and water of condensation of a plant can be returned and utilized without waste.

I claim as my invention—

1. A water feeding, heating and return apparatus consisting of a heating-chamber, a water-main connected with the heating-chamber and adapted to be connected with a water-supply, a feed-pipe connected with the heating-chamber and adapted to be connected with a boiler, a steam-pipe connected with the heating-chamber and adapted to be connected with a boiler, and a return-pipe connected with the steam-pipe and adapted to be connected with the various drips of the plant, substantially as specified.

2. A water feeding, heating and return apparatus consisting of a heating-chamber, a water-main connected with the heating-chamber and adapted to be connected with a water-supply, a float operated by the level of the water in the heating-chamber, a valve in the water-main connected with the float, a feed-pipe connected with the heating-chamber and adapted to be connected with a boiler, a steam-pipe connected with the heating-chamber and adapted to be connected with a boiler, and a return-pipe connected with the steam-pipe and adapted to be connected with the various drips of the plant, substantially as specified.

3. A water feeding, heating and return apparatus consisting of a heating-chamber, a water-main connected with the heating-chamber and adapted to be connected with a water-supply, a relief-valve connected with the water-main, a float operated by the level of the water in the heating-chamber, a valve in the water-main connected with the float, a feed-pipe connected with the heating-chamber and adapted to be connected with a boiler, a steam-pipe connected with the heating-chamber and adapted to be connected with a boiler, and a return-pipe connected with the steam-pipe and adapted to be connected with the various drips of the plant, substantially as specified.

4. A water feeding, heating and return apparatus consisting of a heating-chamber, a water-main connected with the heating-chamber and adapted to be connected with a water-supply, a feed-pipe connected with the heating-chamber and adapted to be connected with a boiler, a steam-pipe connected with the heating-chamber and adapted to be connected with a boiler, a suction-T located in the steam-pipe, and a return-pipe connected with a branch of the suction-T and adapted to be connected with the various drips of the plant, substantially as specified.

5. A water feeding, heating and return apparatus consisting of a heating-chamber, a water-main connected with the heating-chamber and adapted to be connected with a water-supply, a feed-pipe connected with the heating-chamber and adapted to be connected with a boiler, a steam-pipe connected with the heating-chamber and adapted to be connected with a boiler, a return-pipe connected with the steam-pipe and adapted to be connected with the various drips of the plant, an escape-pipe connected with the heating-chamber, and a reducing-valve located in the escape-pipe, substantially as specified.

6. A water feeding, heating and return apparatus consisting of a heating-chamber, a water-main connected with the heating-chamber and adapted to be connected with a water-supply, a chamber connected by pipes with the heating-chamber at about the water-level of the heating-chamber, a float operated by the level of the water in the heating-chamber, a valve in the water-main connected with the float, a feed-pipe connected with the heating-chamber and adapted to be connected with a boiler, a steam-pipe connected with the heating-chamber and adapted to be connected with a boiler, and a return-pipe connected with the steam-pipe and adapted to be connected with the various drips of the plant, substantially as specified.

7. A water feeding, heating and return apparatus consisting of a heating-chamber, a water-main connected with the heating-chamber and adapted to be connected with a water-supply, a chamber connected by pipes with the heating-chamber at about the water-level of the heating-chamber, a float located in the exterior chamber, a lever connected with the float, a valve in the water-main, said valve being connected with the exterior chamber by means of a plug, a spindle joining the valve-disks and the float-lever, a feed-pipe connected with the heating-chamber and adapted to be connected with a boiler, a steam-pipe connected with the heating-chamber and adapted to be connected with a boiler, and a return-pipe connected with the steam-pipe and adapted to be connected with the various drips of the plant, substantially as specified.

8. A water feeding, heating and return apparatus consisting of a heating-chamber, a tubular supporting-post within the heating-chamber, dished baffle-plates supported by the tubular post in the heating-chamber, the baffle-plates being alternately arranged with the hollows up and down, a spraying device located in the upper part of the heating-chamber, a water-main connected with the spraying device and adapted to be connected with a water-supply, a feed-pipe connected with the heating-chamber and adapted to be connected with a boiler, a steam-pipe connected with the tubular support within the heating-chamber and adapted to be connected with a boiler, and a return-pipe connected with the steam-pipe and adapted to be connected with the various drips of the plant, substantially as specified.

EDGAR P. HOLLY.

Witnesses:
E. J. HYDE,
H. R. WILLIAMS.